(12) United States Patent
Gillespie

(10) Patent No.: US 6,207,899 B1
(45) Date of Patent: Mar. 27, 2001

(54) THERMOSTAT COVER

(76) Inventor: Laymon Gillespie, 17 Capitol Hill Dr., St. Louis, MO (US) 63136

(*) Notice: Subject to any disclaimer, the term of this patent is extended or adjusted under 35 U.S.C. 154(b) by 0 days.

(21) Appl. No.: 09/357,628

(22) Filed: Jul. 20, 1999

(51) Int. Cl.⁷ .................................................. H02G 3/14
(52) U.S. Cl. .......................................... 174/66; 220/241
(58) Field of Search .................. 174/66, 67; 220/241, 220/242, 3.8

(56) References Cited

U.S. PATENT DOCUMENTS

| | | | |
|---|---|---|---|
| 3,200,989 | 8/1965 | Hubbell | 220/24.3 |
| 3,598,900 | * 8/1971 | Drake | 174/66 X |
| 4,036,396 | * 7/1977 | Kennedy et al. | 220/242 |
| 4,282,591 | * 8/1981 | Andreuccetti | 174/66 X |
| 4,326,395 | 4/1982 | DeRosa | 70/168 |
| 4,449,015 | 5/1984 | Hotchkiss et al. | 174/138 F |
| 4,823,381 | 4/1989 | Olson | 379/399 |
| 5,067,907 | 11/1991 | Shotey | 439/135 |
| 5,077,452 | 12/1991 | Mathers et al. | 200/43.01 |
| 5,280,135 | * 1/1994 | Berlin et al. | 174/67 |
| 5,294,047 | * 3/1994 | Schwer et al. | 236/46 R |
| 5,401,904 | * 3/1995 | Greenier, Jr. | 174/67 |
| 5,482,209 | * 1/1996 | Cochran et al. | 236/46 R |
| 5,874,693 | * 2/1999 | Rintz | 174/66 |
| 6,051,787 | * 4/2000 | Rintz | 174/66 |

* cited by examiner

Primary Examiner—Dean A. Reichard
(74) Attorney, Agent, or Firm—Henderson & Sturm LLP

(57) ABSTRACT

A thermostat cover assembly comprising a housing having a number of flanges for screwing the housing to a wall over an existing thermostat. A hinged door is provided and is constructed of a transparent plastic material and includes a digital clock mechanism that provides a time function in one mode of operation and an elapsed time function wherein the time since the last time the door was in the open position is displayed. This mode prevents needless tampering with the thermostat if the thermostat setting has been set within the last hour or so. In addition, the cover is connected to a switch that operates a light. When the door is opened, the light illuminates the thermostat allowing for adjustment at night.

4 Claims, 1 Drawing Sheet

THERMOSTAT COVER

BACKGROUND OF THE INVENTION

1. Field of the Invention

The present invention relates to the field of thermostat covers, and more particularly to a thermostat cover with a door activated light and a clock.

2. Description of Related Art

As can be seen by reference to the following U.S. Pat. Nos. 3,200,989; 4,326,395; 4,449,015; 4,823,381; 5,067,907; and 5,077,452, the prior art is replete with myriad and diverse covers for electrical devices.

While all of the aforementioned prior art constructions are more than adequate for the basic purpose and function for which they have been specifically designed, they are uniformly deficient with respect to their failure to provide a simple, efficient, and practical thermostat cover.

As a consequence of the foregoing situation, there has existed a longstanding need for a new and improved type of thermostat cover, and the provision of such a construction is a stated objective of the present invention.

BRIEF SUMMARY OF THE INVENTION

Briefly stated, the present invention provides a thermostat cover assembly comprising a housing having a number of flanges for screwing the housing to a wall over an existing thermostat. A hinged door is provided and is constructed of a transparent plastic material and includes a digital clock mechanism that provides a time function in one mode of operation and an elapsed time function wherein the time since the last time the door was in the open position is displayed. This mode prevents needless tampering with the thermostat if the thermostat setting has been set within the last hour or so. In addition, the cover is connected to a switch that operates a light. When the door is opened, the light illuminates the thermostat allowing for adjustment at night.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
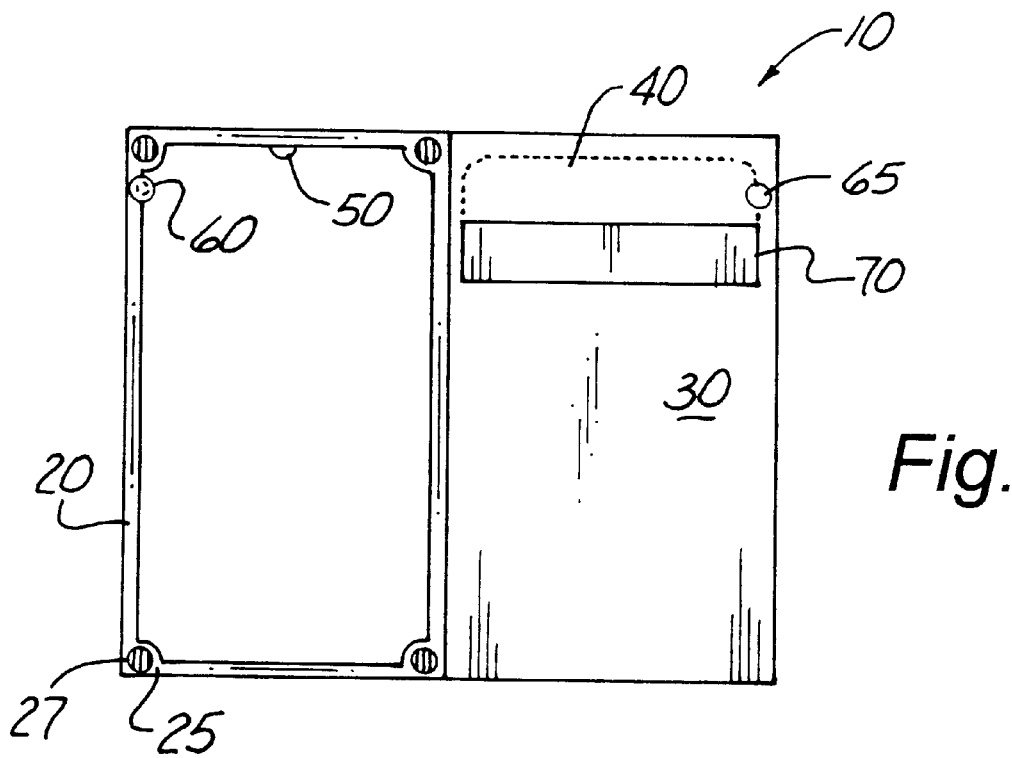
FIG. 1 is a front elevational view of the thermostat cover of the present invention with the door opened.
Figure 2:
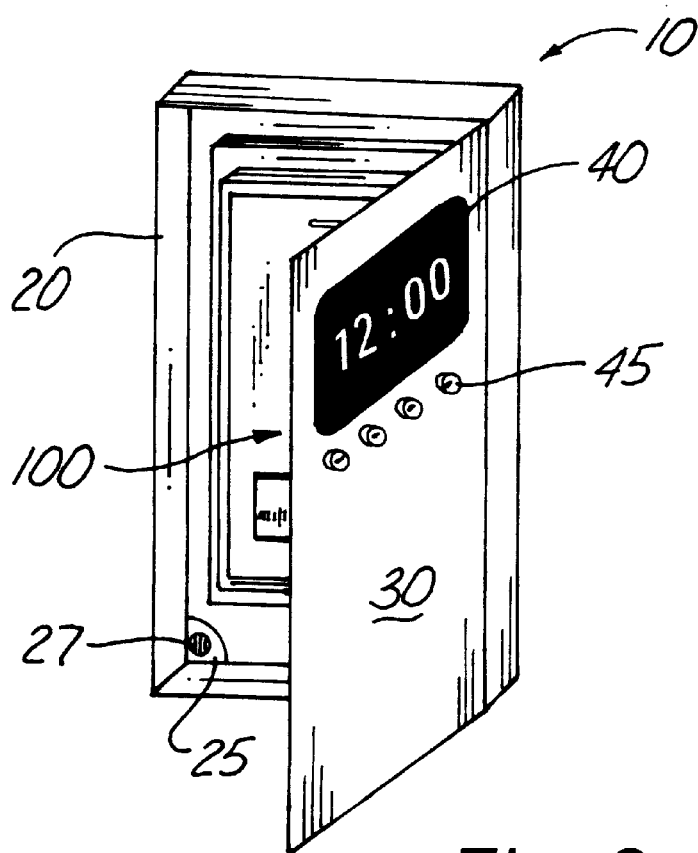
FIG. 2 is a front perspective view of the clock mounted on the door.

As can be seen by reference to the drawings, and in particular to FIG. 1, the thermostat cover that forms the basis of the present invention is designated generally by the reference number 10. The concept of the thermostat cover 10 is that of a wall mounted protective enclosure 20 for a thermostat 100.

The thermostat cover 10 is a plastic enclosure 20 that fits over a thermostat 100 to protect it from being accidentally bumped. The design allows it to be installed over an existing thermostat 100 and the front incorporates a transparent hinged door 30 with a built in battery operated digital clock 40. An internal battery powered light 50 comes on automatically anytime the door 30 is opened.

The thermostat cover 10 is fabricated of plastic in the shape of a square, rectangular, or round enclosure with an open back. The front features a door 30 with a built in battery operated digital clock 40, and the interior of the enclosure has a battery powered light 50 that operates via a spring loaded plunger switch 60 with a magnetic catch 65, anytime the door is opened. The light 50 operates off the same battery 70 as the clock 40. The light switch 60 serves to hold the door 30 closed as the magnet mates with a metal catch 65 on the door 30. The rear perimeter of the enclosure 20 has a plastic lip 25 with four screw holes 27 allowing the thermostat cover 10 to be easily attached to a wall with the use of four small screws. The thermostat cover 10 could be manufactured in a variety of colors so as to accent the decor of any home.

In use, the user simply affixes the thermostat cover 10 to the wall over their thermostat 100. They then enjoy the benefit of having a protective enclosure 20 covering the thermostat 100 preventing it from being accidentally bumped. When access to the thermostat 100 is desired, the door 30 is opened, the light 50 comes on, and the user is able to adjust the thermostat 100 even in the dark. The clock 40 not only makes the thermostat cover 10 more attractive, but provides added functionality, since an elapsed time function button 45 displays the time since the door 30 was last opened. Use of the thermostat cover 10 provides a very practical and inexpensive solution to the problem of a thermostat being accidentally bumped in the dark, causing the temperature setting to be changed.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A thermostat cover, comprising:
    an enclosure having an open back, an open front, and a side panel extending between the open back and open front, the enclosure being sized to extend around a thermostat and being attached to a wall portion disposed adjacent the thermostat;
    a hinged transparent door attached to the enclosure;
    an electric light attached to the enclosure;
    an electric battery attached to the door and being electrically coupled to the light; and
    a spring loaded switch electrically coupled to the light and attached to the enclosure and disposed to be activated when the door is opened and deactivated when the door is closed.

2. The thermostat cover of claim 1 further including a magnetic latch attached to the door and disposed to contact and deactivate the switch when the door is closed.

3. The thermostat cover of claim 1 further including a digital clock attached to the door and electrically coupled to the battery.

4. The thermostat cover of claim 3 wherein the digital clock includes an elapsed time function for displaying the time since the door was last opened.

* * * * *